United States Patent [19]
Hicks et al.

[11] Patent Number: 5,787,478
[45] Date of Patent: Jul. 28, 1998

[54] METHOD AND SYSTEM FOR IMPLEMENTING A CACHE COHERENCY MECHANISM FOR UTILIZATION WITHIN A NON-INCLUSIVE CACHE MEMORY HIERARCHY

[75] Inventors: Dwain Alan Hicks, Pflugerville; Peichun Peter Liu, Austin; Michael John Mayfield, Austin; Rajinder Paul Singh, Austin, all of Tex.

[73] Assignee: International Business Machines Corporation, Armonk, N.Y.

[21] Appl. No.: 810,775

[22] Filed: Mar. 5, 1997

[51] Int. Cl.[6] .................................................. G06F 12/00
[52] U.S. Cl. .................. 711/141; 711/122; 711/144; 711/130; 711/163
[58] Field of Search ........................ 711/141, 122, 711/144, 130, 163, 100, 117, 118, 113

[56] References Cited

U.S. PATENT DOCUMENTS

| 5,369,753 | 11/1994 | Tipley | 711/122 |
|---|---|---|---|
| 5,379,396 | 1/1995 | Gochman et al. | 711/141 |
| 5,428,761 | 6/1995 | Herlihy et al. | 711/130 |
| 5,564,035 | 10/1996 | Lai | 711/144 |
| 5,636,365 | 6/1997 | Tanioka | 711/163 |

OTHER PUBLICATIONS

MIPS Technologies, Inc. Chapter. 11, The R4400 Microprocessor User's Manual, Mar. 21, 1996.

*Primary Examiner*—Tod R. Swann
*Assistant Examiner*—Mehdi Namazi
*Attorney, Agent, or Firm*—Anthony V. S. England; Antony P. Ng; Andrew J. Dillon

[57] ABSTRACT

A method and system of implementing a cache coherency mechanism for supporting a non-inclusive cache memory hierarchy within a data processing system is disclosed. In accordance with the method and system of the invention, the memory hierarchy includes a primary cache memory, a secondary cache memory, and a main memory. The primary cache memory and the secondary cache memory are non-inclusive. Further, a first state bit and a second state bit are provided within the primary cache, in association with each cache line of the primary cache. As a preferred embodiment, the first state bit is set only if a corresponding cache line in the primary cache memory has been modified under a write-through mode, while the second state bit is set only if a corresponding cache line also exists in the secondary cache memory. As such, the cache coherency between the primary cache memory and the secondary cache memory can be maintained by utilizing the first state bit and the second state bit in the primary cache memory.

18 Claims, 6 Drawing Sheets

METHOD AND SYSTEM FOR IMPLEMENTING A CACHE COHERENCY MECHANISM FOR UTILIZATION WITHIN A NON-INCLUSIVE CACHE MEMORY HIERARCHY

BACKGROUND OF THE INVENTION

1. Technical Field

The present invention relates in general to data processing systems and, in particular, to a cache memory for utilization within a high-performance data processing system. Still more particularly, the present invention relates to a method and system for implementing a cache coherency mechanism for supporting a non-inclusive cache memory hierarchy within a high-performance data processing system.

2. Description of the Prior Art

Computer architectures involving multiple level of cache memories have become an area of particular interest and technology growth in recent years. The prevailing investigations have previously dealt with two-level cache memory hierarchies and the related protocols for operating such cache memory hierarchies to maximize processor performance while satisfying cache coherency requirements of the system.

A two-level cache memory hierarchy is a cache memory system consisting of two cache memories of different size and speed. Typically, the first cache memory, commonly known as the primary cache or L1 cache, has a faster access time and a higher cost per bit while the second memory, commonly known as the secondary cache or L2 cache, has a slower access time but also a lower cost per bit. Typically, the smaller and faster primary cache is on-chip while the larger and slower secondary cache is off-chip, though an on-chip secondary cache is also quite common in some high-performance processor designs.

The primary objective of a coherent memory system is to provide the same copy of information to all memory devices within the memory hierarchy for allowing synchronization and cooperative usage of resource sharing. Otherwise, problems will occur when an old or stale copy of information is utilized inadvertently. Hence, under a scheme called inclusion, a primary cache is normally designed to contain a subset of data stored in a secondary cache. This inclusion scheme provides a certain level of redundancy between the primary cache and the secondary cache so that the bus traffic to the primary cache may be reduced. However, there are also disadvantages associated with the inclusion scheme. One disadvantage being additional cast-out from a primary cache to a system memory will be required to accommodate for a line refill operation when the cache line being replaced in the secondary cache is different from that in the primary cache and that the cache line being replaced in the secondary cache is in a "modify" status. Incidentally, the cache line in the primary cache having the same address as the cache line being replaced in secondary cache needs to be casted out to the system memory because it cannot exist in the primary cache alone according to the inclusion scheme.

Although cache performance should be improved if the restriction of inclusion is relaxed via a non-inclusive cache memory hierarchy, a special protocol must be utilized in order to maintain the coherency between the primary cache and the secondary cache. The present invention is intended to provide a cache coherency mechanism to support a non-inclusive primary cache and secondary cache.

SUMMARY OF THE INVENTION

In view of the foregoing, it is therefore one object of the present invention to provide an improved method and system for data processing.

It is another object of the present invention to provide an improved method and system for a cache memory to be utilized within a high-performance data processing system.

It is yet another object of the present invention to provide an improved method and system for implementing a cache coherency mechanism for supporting a non-inclusive cache memory hierarchy within a high-performance data processing system.

The foregoing objects are achieved as is now described. In accordance with a method and system of the present invention, the memory hierarchy within a high-performance data processing system includes a primary cache memory, a secondary cache memory, and a main memory. The primary cache memory and the secondary cache memory are non-inclusive. Further, a first state bit and a second state bit are provided within the primary cache, in association with each cache line of the primary cache. As a preferred embodiment, the first state bit is set only if a corresponding cache line in the primary cache memory has been modified under a write-through mode, while the second state bit is set only if a corresponding cache line also exists in the secondary cache memory. As such, the cache coherency between the primary cache memory and the secondary cache memory can be maintained by utilizing the first state bit and the second state bit in the primary cache memory.

All objects, features, and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any multi-level non-inclusive cache memory hierarchy data processing system. Also, it is understood that the features of the present invention may be applicable in various data processing systems having a primary cache and a secondary cache, or wherever multiple cache memory accesses are required.

Figure 1:
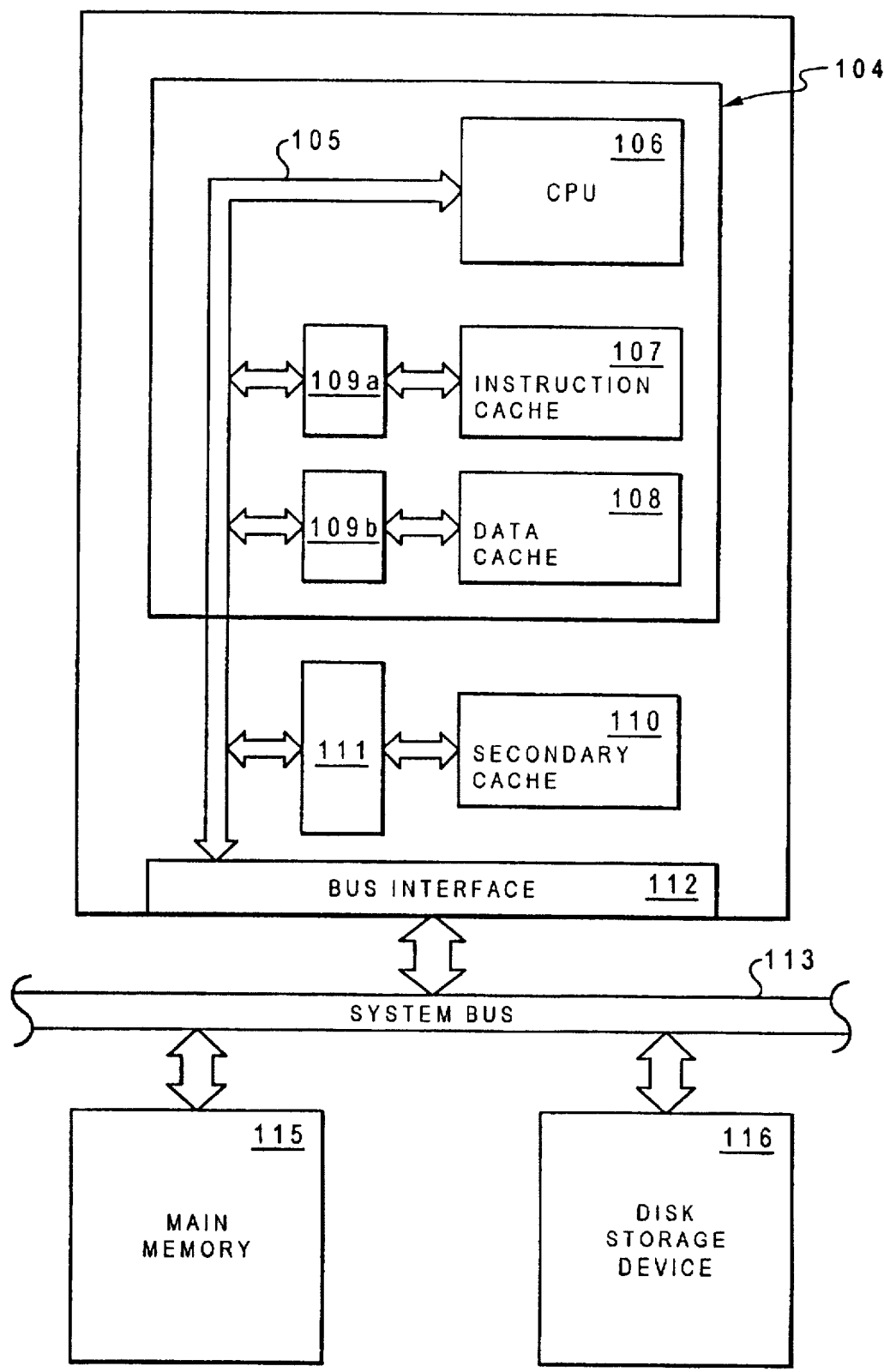
FIG. 1 is a block diagram of a typical data processing system having a multi-level non-inclusive cache memory hierarchy according to a preferred embodiment of the invention.

Referring now to the drawings and in particular to FIG. 1, there is illustrated a block diagram of a typical data processing system in which a multi-level non-inclusive cache memory hierarchy may be incorporated according to a preferred embodiment of the invention. In FIG. 1, only a single processor 104 is shown; however, the features of the present invention are also useful in a multi-processor system. Processor 104, having a CPU 106 which may be of a superscalar RISC type, is constructed as a single-chip device comprising on-chip instruction cache 107 and on-chip data cache 108. Both caches 107, 108 are primary caches and are connected to CPU 106 by separate paths within a local bus structure. Instruction cache 107 is connected to local bus 105 via cache controller 109a, while data cache 108 is connected to local bus 105 via cache controller 109b.

A secondary cache 110 is also connected to local bus 105 via cache controller 111. Secondary cache 110 is usually much larger than either instruction cache 107 or data cache 108, and that access to secondary cache 110 is also somewhat slower than to either instruction cache 107 or data cache 108. CPU 106 is also connected to system bus 113 via bus interface 112 in which timing and control translations between local bus 105 and system bus 113 are taking place. In addition, a main memory 1 15 and a disk storage device 116 are coupled to system bus 113.

Instruction cache 107 and data cache 108 may be addressed by effective (ie., untranslated) addresses as well as by real (i.e., physical) addresses. Thus, local bus 105 within processor 104 has a number of address buses, including effective address buses, real address buses, and instruction address buses. In contrast, secondary cache 110 is typically addressed by real addresses only.

As shown, the memory hierarchy is from the fastest to the slowest, from the smallest to the largest, and from the most expensive per bit to the least expensive per bit, in progression from primary caches 107, 108 to secondary cache 110, to main memory 115, and to disk storage device 116. Typically, main memory 115 contains a subset of what is in disk storage device 116, and secondary cache 110 contains a subset of what is in main memory 115. However, because of the non-inclusive relationship between primary caches 107, 108 and secondary cache 110, each of caches 107, 108 may contain information independent of what is in secondary cache 110.

CPU 106 can access primary caches 107, 108 within a processor cycle, while it may take several processor cycles to access secondary cache 110. If a cache "miss" occurs in primary caches 107, 108, and secondary cache 110, then main memory 115 is accessed to perform a cache linefill operation—replacing a cache line with an equivalent bit portion from main memory 115 which contains the addressed data. This cache linefill operation must be performed in order to satisfy the attempted cache access for which a cache "miss" occurred. If main memory 115 does not contain the location for which the cache linefill operation is attempted, then a page containing this data is obtained from disk storage device 116 such that the cache linefill operation can be completed. The time for acquiring a page from disk storage device 116 and writing it to main memory 115 typically requires many thousands of processor cycles, during which CPU 106 may be switched to do another task or stalled in order to wait for the data to satisfy the request.

Figure 2:
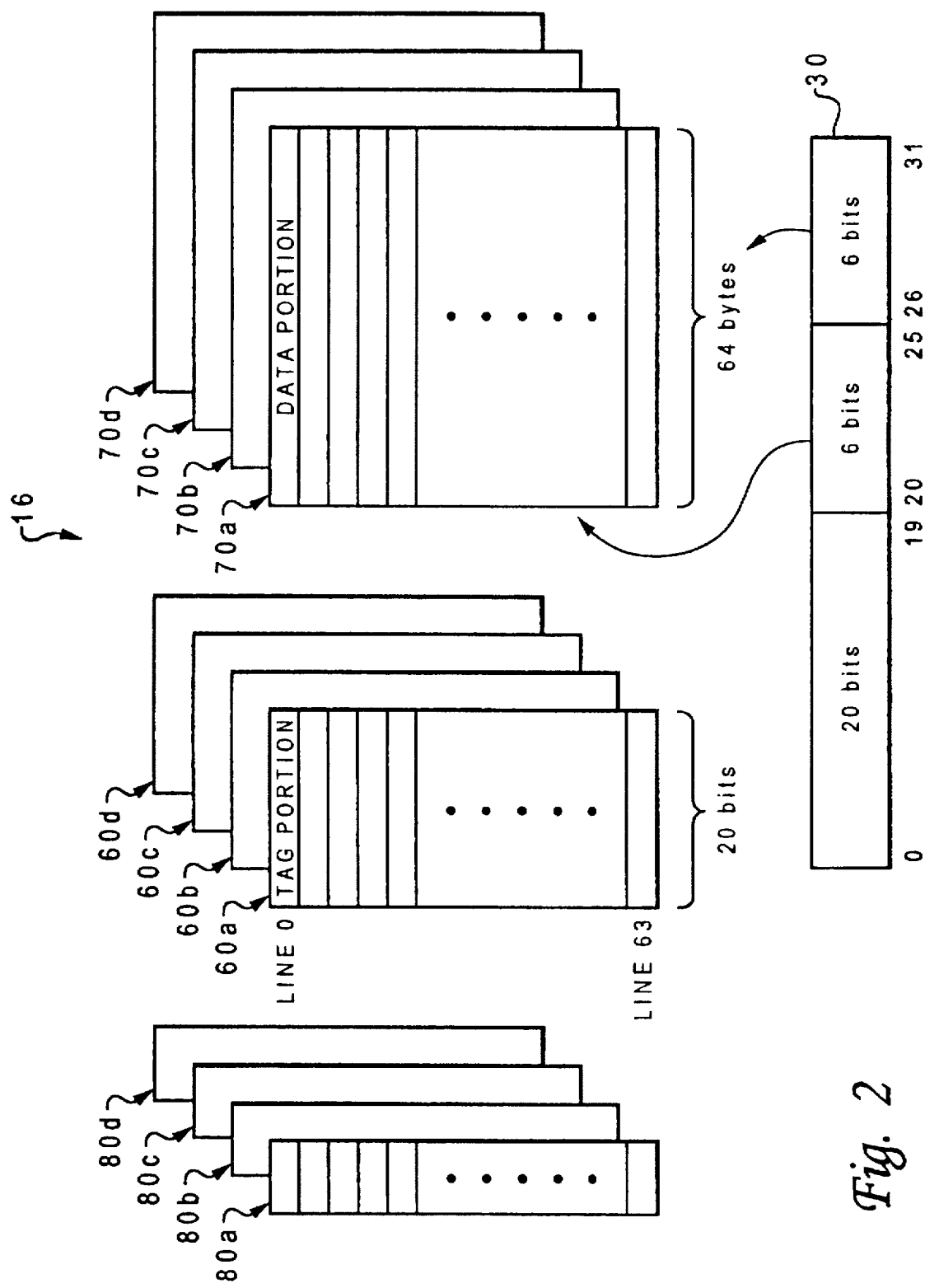
FIG. 2 is a block diagram of the organization of a primary cache in accordance with a preferred embodiment of the invention.

With reference now to FIG. 2, there is depicted a block diagram of the organization of a primary cache 16 in accordance with a preferred embodiment of the invention. Primary cache 16 may be instruction cache 107 and/or data cache 108. Primary cache 16 is preferably configured as a four-way cache—way 0, way 1, way 2, and way 3—with each way having 64 cache lines. Each way of data cache 16 is further divided into three portions, namely a tag portion, a data portion and a state bit portion. As shown in FIG. 2, the tag portion includes tag set 60a, tag set 60b, tag set 60c, and tag set 60d for way 0, way 1, way 2, and way 3, respectively. Similarly, the data portion includes data set 70a, data set 70b, data set 70c, and data set 70d for way 0, way 1, way 2, and way 3, respectively. Also, the state bit portion includes state bit field 80a, state bit field 80b, state bit field 80c, and state bit field 80d for way 0, way 1, way 2, and way 3, respectively. Each of tag sets 60a–60d corresponds to each of data sets 70a–70d. Because all tag sets 60a–60d, data sets 70a–70d, and state bit field 80a–80d are of identical configuration, only tag set 60a, data set 70a, and state bit field 80a will be described in detail as follows.

Each of tag set 60a and data set 70a has 64 cache lines, from line 0 to line 63, and each cache line is indexed by bits 20–25 of address 30. Each cache line of data set 70a is 64 bytes (or 16 words) wide, while each cache line of tag set 60a is only 20 bits wide. Each cache line in data set 70a contains actual information that may be required by CPU 106, and each byte within the cache line is indexed by bits 26–31 of address 30. On the other hand, each cache line in tag set 60a contains an address tag that is utilized for comparison with bits 0–19 of address 30 in order to determine whether there is a cache "hit" or "miss." Incidentally, a match between an address tag in one of tag sets 60a–60d and bits 0–19 of address 30 means a cache "hit."

Figure 3:
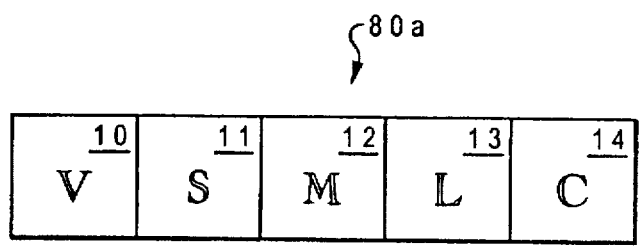
FIG. 3 is a detailed depiction of a state bit field in the primary cache, according to a preferred embodiment of the invention.

Referring now to FIG. 3, there is illustrated a detailed depiction of a state bit field 80a of one cache line, in accordance with a preferred embodiment of the invention. As shown, state bit field 80a contains five different state bits, namely, a valid bit 10, a shared bit 11, a modify bit 12, an L bit 13, and a C bit 14. Valid bit 10, shared bit 11, and modify bit 12 together are utilized to implement a four-state MESI (modified, exclusive, shared, and invalid) protocol. The implementation of the four-state MESI protocol is well known to those ordinarily skilled in the art of cache memory design. The remaining L bit 13 and C bit 14 are for implementing a cache coherency mechanism for supporting a non-inclusive primary cache and secondary cache, in accordance with a preferred embodiment of the invention.

Figure 4:
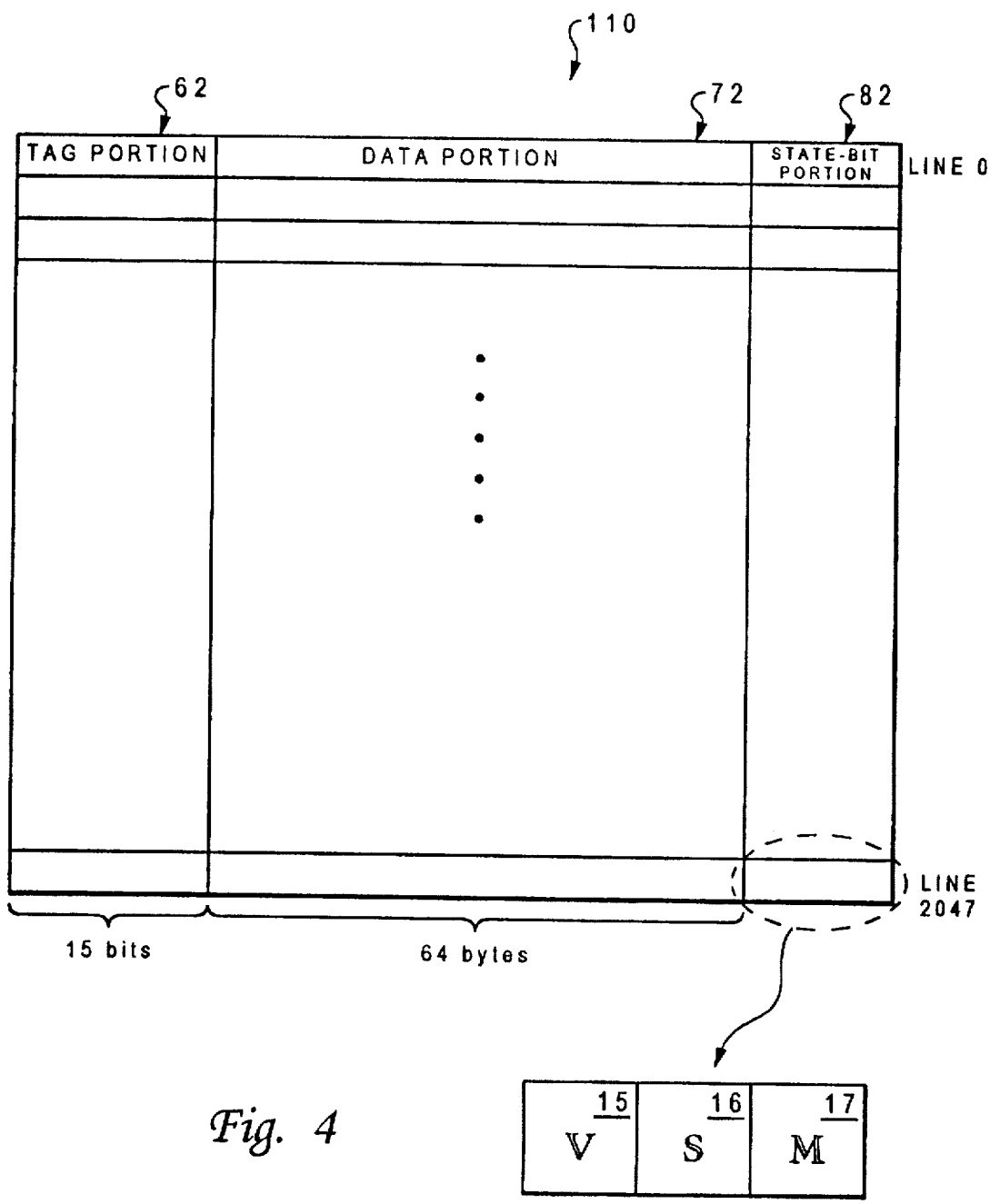
FIG. 4 is a block diagram of the organization of a secondary cache in accordance with a preferred embodiment of the invention.

With reference now to FIG. 4, there is depicted a block diagram of the organization of secondary cache 110 in accordance with a preferred embodiment of the invention. Secondary cache 110 is preferably configured as a direct-mapped cache having 2048 cache lines. Each cache line is divided into a tag portion 62, a data portion 72 and a state bit portion 82. State bit portion 82 of each cache line contains three state bits, namely, a valid bit 15, a shared bit 16, and a modify bit 17. Each cache line of data portion 72 is 64 bytes (or 16 words) wide, while each cache line of tag portion 62 is only 15 bits wide. Each cache line in data portion 72 contains actual information that may be required by CPU 106.

Similar to primary cache 16, each cache line in secondary cache 110 is indexed by bits 15–25 of address 30, and each byte within the cache line is indexed by bits 26–31 of address 30. Further, each cache line in tag portion 62 contains an address tag that is utilized for comparison with bits 0–14 of address 30 in order to determine whether there is a cache "hit" or "miss."

Figure 5A:
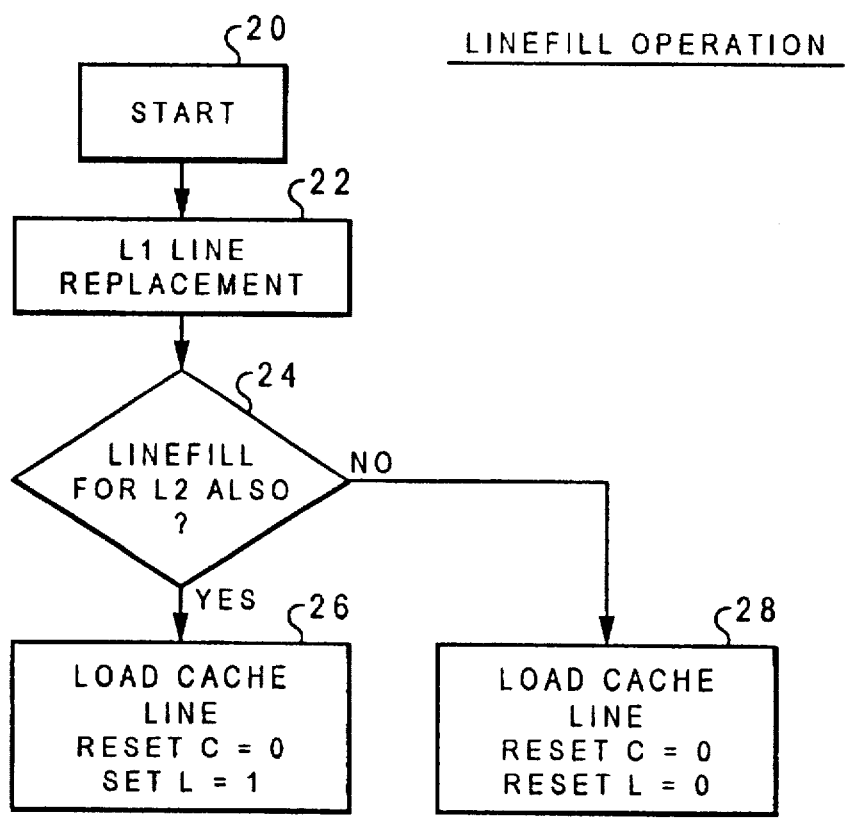
FIG. 5a is a high-level logic flow diagram of a linefill operation utilizing an L bit and a C bit, in accordance with a preferred embodiment of the invention.

Referring now to FIG. 5a, there is illustrated a high-level logic flow diagram of a linefill operation utilizing an L bit and a C bit, in accordance with a preferred embodiment of the invention. When there is a cache "miss," a refill operation first start with the primary cache, as shown in block 20. Then, a cache line is selected for replacement, as depicted in block 22. The details of line replacement in the primary cache will be further described in FIG. 5b. A determination is then made as to whether the linefill operation should also be performed to the secondary cache or not, as depicted in block 24. If the linefill operation should not be performed to the secondary cache, then data is loaded to the corresponding cache line in the primary cache and both the C bit and the L bit of the corresponding cache line are reset to a "0," as shown in block 28. Otherwise, if the linefill operation should also be performed to the secondary cache, then a cache line in the secondary cache is selected for replacement. Data is subsequently loaded into the corresponding cache line of the primary cache and the secondary line, the C bit of the corresponding cache line in the primary cache is reset to a "0," and the L bit of the corresponding cache line in the primary cache is set to a "1," as shown in block 26. Conventionally, setting a bit implies setting the bit to a logical "1" while resetting a bit implies resetting a bit to a logical "0," though a reverse assignment is also acceptable.

Figure 5B:
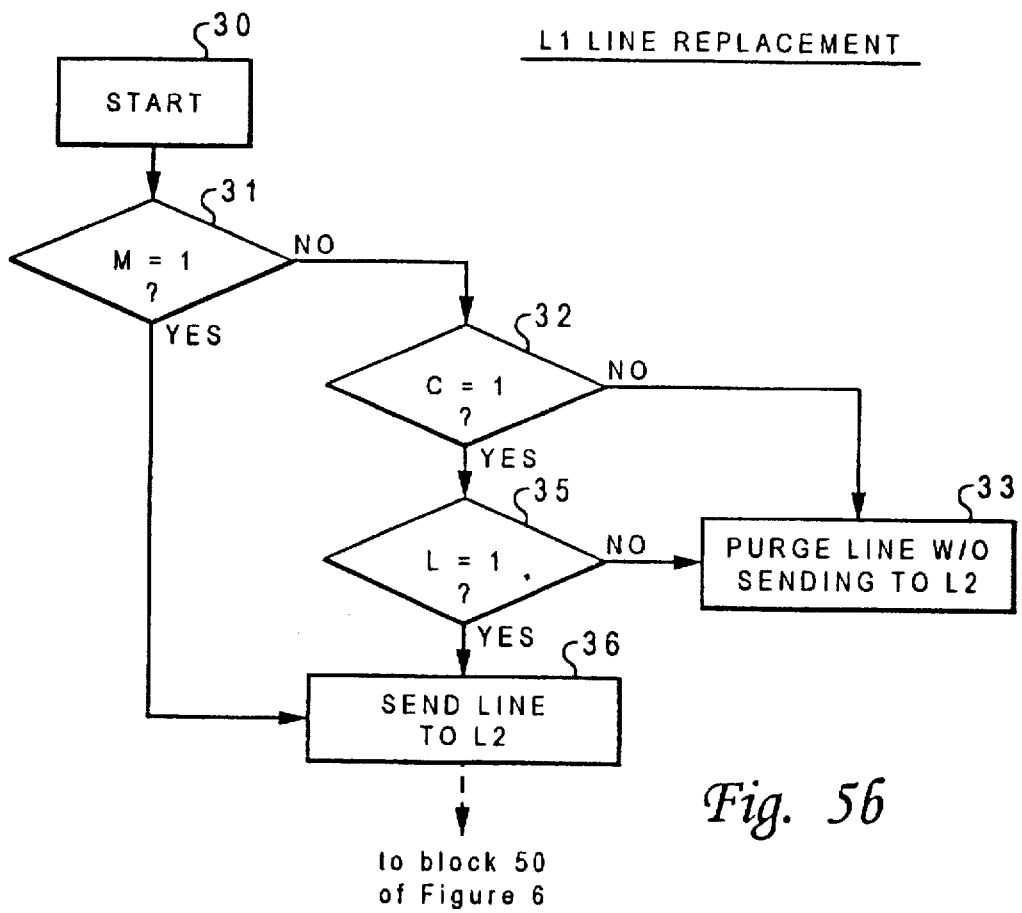
FIG. 5b is a high-level logic flow diagram of a line replacement operation for the primary cache, in accordance with a preferred embodiment of the invention.

Referring now to FIG. 5b, there is illustrated a high-level logic flow diagram of a line replacement operation for the primary cache, in accordance with a preferred embodiment of the invention. Starting at block 30, a determination is made as to whether the modify (M) bit or the C bit of the cast-out candidate cache line is set, as shown in block 31 and block 32. If neither the modify bit nor the C bit of the cast-out candidate cache line is set, the cast-out candidate cache line is purged without sending to the secondary cache, as depicted in block 33. Otherwise, if the modify bit of the cast-out candidate cache line is set, the cast-out candidate cache line is sent to the secondary cache, as shown in block 36. Similarly, if the modify bit is not set but both the C bit and the L bit of the cast-out candidate cache line are set, the cast-out candidate cache line is also sent to the secondary cache, as shown in block 32, block 35 and block 36.

Figure 5C:
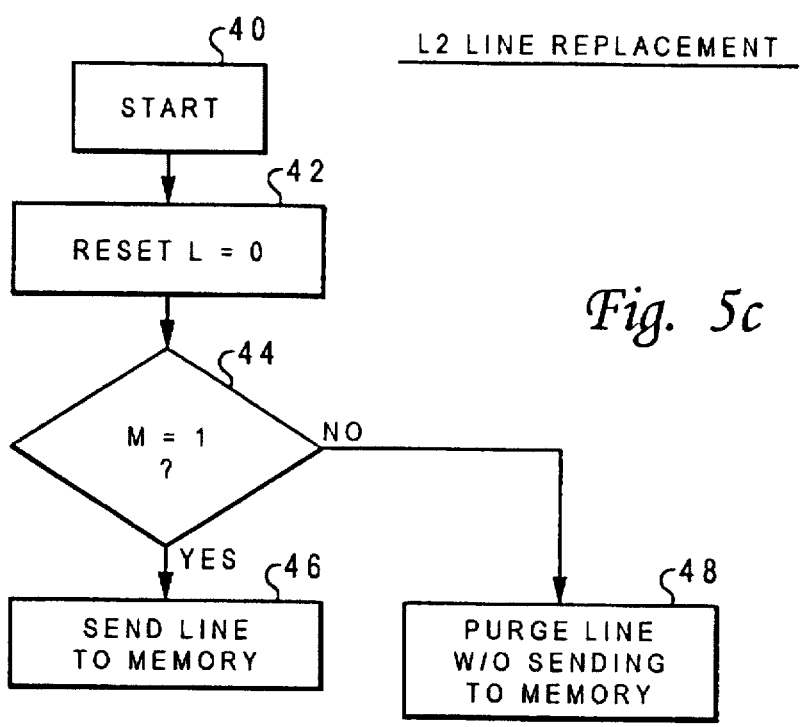
FIG. 5c is a high-level logic flow diagram of a line replacement operation for the secondary cache, in accordance with a preferred embodiment of the invention.

Referring now to FIG. 5c, there is illustrated a high-level logic flow diagram of a line replacement operation for the secondary cache, in accordance with a preferred embodiment of the invention. Starting at block 40, the L bit of the cast-out candidate cache in the primary is reset to a "0," as shown in block 42. Then, a determination is made as to whether the modify bit of the cast-out candidate cache line is set or not, as shown in block 44. If the modify bit of the cast-out candidate cache line is not set, the cast-out candidate cache line is purged without sending to the main memory, as depicted in block 48. Otherwise, if the modify bit of the cast-out candidate cache line is set, the cast-out candidate cache line is sent to the main memory, as shown in block 46.

Figure 6:
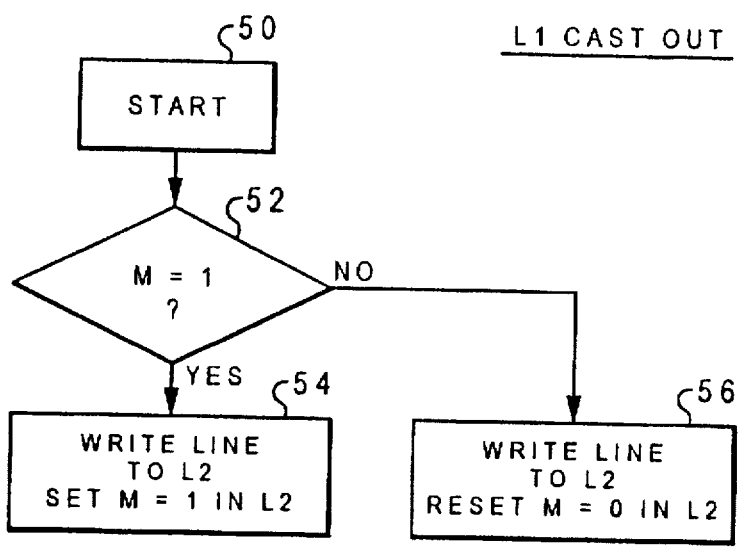
FIG. 6 is a high-level logic flow diagram of a cast-out operation from the primary cache, in accordance with a preferred embodiment of the invention.

With reference now to FIG. 6, there is illustrated a high-level logic flow diagram of a cast-out operation from the primary cache, in accordance with a preferred embodiment of the invention. Starting at block 50, a determination is made as to whether the modify bit of the cast-out candidate cache line is set or not, as shown in block 52. If the modify bit of the cast-out candidate cache line is set, the cache line is written to the secondary cache and the modify bit in that cache line is set to a "1." Otherwise, if the modify bit of the cast-out candidate cache line is not set, the cache line is still written to the secondary cache but the modify bit in that cache line is reset to a "0."

Subsequently, when a cache line in the secondary cache ages out for a linefill operation, the corresponding cache line is sent to the main memory only if its modify bit is set. Otherwise, the corresponding cache line is purged.

Figure 7:
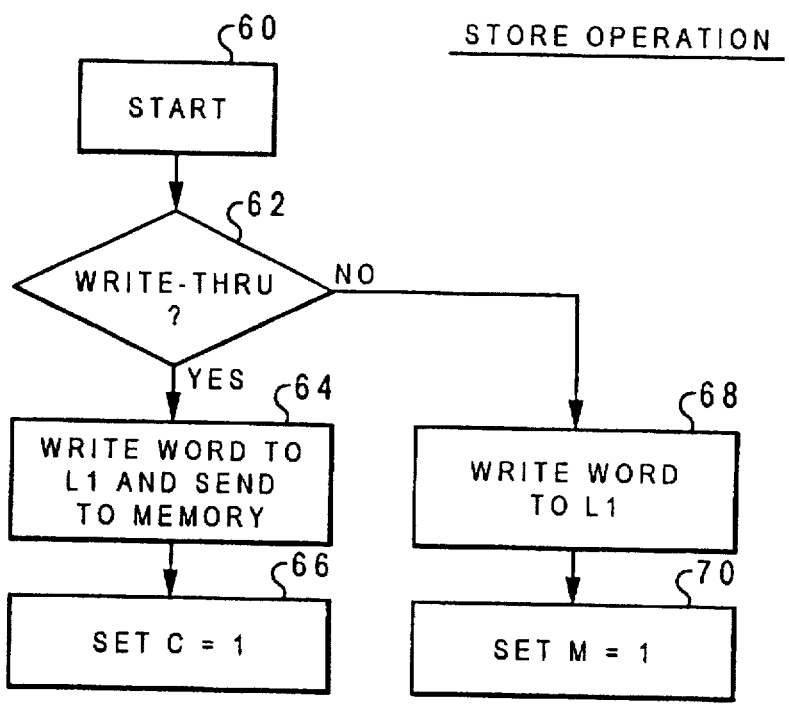
FIG. 7 is a high-level logic flow diagram of a store operation to the primary cache, in accordance with a preferred embodiment of the invention.

Referring now to FIG. 7, there is illustrated a high-level logic flow diagram of a store operation to the primary cache, in accordance with a preferred embodiment of the invention. For a store operation to the primary cache, a determination is first made as to whether the primary cache is in a write-through mode or not, as illustrated in block 62. If the primary cache is not in the write-through mode (that means the primary cache is in a write-back mode), the data word is written to the primary cache and the modify bit of the corresponding cache line is set to a "1," as depicted in block 68 and block 70, respectively. Otherwise, if the primary cache is in the write-through mode, the data word is written to the primary cache and the main memory, without writing to the secondary cache, and the C bit is set to a "1," as shown in block 64 and block 66, respectively.

In summary, under a write-through mode, a store operation writes a data word to the primary cache and the main memory and sets the C bit of the corresponding cache line in the primary cache. In a write-back mode, the store operation writes the data word to the primary cache only and sets the modify bit of the corresponding cache line in the primary cache. When the time comes for a linefill operation for the primary cache, if either the modify bit or the C bit of a cast-out candidate cache line is set, the cast-out candidate cache line is sent to the secondary cache. However, if nether the modify bit nor the C bit of the cast-out candidate cache line is set, the cast-out candidate cache line is purged without sending to the secondary cache. In any case, the C bit of a cache line is reset to a "0" when a data word is first loaded into the primary cache.

As has been described, the present invention provides a method of implementing a cache coherency mechanism for supporting a non-inclusive cache memory hierarchy within a data processing system. In a write-through mode, a data word is written to the primary cache and the main memory while skipping the secondary cache. Thus, the cache line in the primary cache maintains all the updates and the corresponding cache line in the secondary cache is only updated if the cache line in the primary cache is to be discarded. In this way, because the primary cache accumulates all the data word changes (along with the main memory) until a Snoop or cast-out of the primary cache occurs, the bus traffic to the secondary cache is relieved. In addition, being able to have data in the primary cache and not necessarily in the secondary cache permits the efficient usage of the primary cache that is typically highly associative along with the secondary cache that is typically dense but lowly associative.

While the invention has been particularly shown and described with reference to a preferred embodiment, it will be understood by those skilled in the art that various changes in form and detail may be made therein without departing from the spirit and scope of the invention.

What is claimed is:

1. A method of implementing a cache coherency mechanism for supporting a non-inclusive cache memory hierarchy within a data processing system, wherein said data processing system includes a primary cache memory, a secondary cache memory and a main memory, wherein said primary cache memory and said secondary cache memory are non-inclusive, said method comprising the steps of:

providing a modify bit, a first state bit and, a second state bit in association with each cache line within said primary cache;

setting said first state bit only if a corresponding cache line in said primary cache memory has been modified by a store operation under a write-through mode;

setting said second state bit only if a corresponding cache line exists in both of said primary cache and said secondary cache; and maintaining a cache coherency between said primary cache and said secondary cache utilizing said modify bit, said first state bit, and said second state bit.

2. The method of implementing a cache coherency mechanism for supporting a non-inclusive cache memory hierarchy according to claim 1, wherein said method further includes a step of purging a cache line in said primary cache memory without sending information stored in said cache line to said secondary cache memory during a line replacement for said primary cache memory if said first state bit, said second state bit, and said modify bit in said primary cache memory are not set.

3. The method of implementing a cache coherency mechanism for supporting a non-inclusive cache memory hierarchy according to claim 2, wherein said method further includes a step of sending a cache line in said primary cache memory to said secondary cache memory during said line replacement for said primary cache memory if both said first state bit and said second state bit are set or said modify bit in said primary cache memory is set.

4. The method of implementing a cache coherency mechanism for supporting a non-inclusive cache memory hierarchy according to claim 1, wherein said method further includes a step of purging a cache line in said secondary cache memory without sending information stored in said cache line to said main memory during a line replacement for said secondary cache memory if a modify bit in said secondary cache memory is not set.

5. The method of implementing a cache coherency mechanism for supporting a non-inclusive cache memory hierarchy according to claim 4, wherein said method further includes a step of sending a cache line in said secondary cache memory to said main memory during said line replacement for said secondary cache memory if said modify bit in said secondary cache memory is set.

6. The method of implementing a cache coherency mechanism for supporting a non-inclusive cache memory hierarchy according to claim 1, wherein said method further includes a step of setting a modify bit in said secondary cache memory while writing a cache line to said secondary cache memory during a cast-out for said primary cache memory if said modify bit in said primary cache memory is set.

7. The method of implementing a cache coherency mechanism for supporting a non-inclusive cache memory hierarchy according to claim 6, wherein said method further includes a step of resetting said modify bit in said secondary cache memory while writing a cache line to said secondary cache memory during said cast-out for said primary cache memory if said modify bit in said primary cache memory is not set.

8. A data processing system having a cache coherency mechanism for supporting a non-inclusive cache memory hierarchy, said data processing system comprising:

a main memory;

a primary cache memory, having a modify bit, a first state bit, and a second state bit in association with each cache line within said primary cache; and a secondary cache memory, said secondary cache memory and said primary cache memory are non-inclusive;

means for setting said first state bit only if a corresponding cache line in said primary cache memory has been modified by a store operation under a write-through mode, and for setting said second state bit only if a corresponding cache line exists in both of said primary cache and said secondary cache, wherein coherency of said cache memory may be maintained between said primary cache and said secondary cache utilizing said modify bit, said first state bit, and said second bit.

9. The data processing system having a cache coherency mechanism for supporting a non-inclusive cache memory hierarchy according to claim 8, wherein said data processing system further includes a means for purging a cache line in said primary cache memory without sending information stored in said cache line to said secondary cache memory during a line replacement for said primary cache memory if said first state bit, said second state bit, and said modify bit in said primary cache memory are not set.

10. The data processing system having a cache coherency mechanism for supporting a non-inclusive cache memory hierarchy according to claim 9, wherein said data processing system further includes a means for sending a cache line in said primary cache memory to said secondary cache memory during said line replacement for said primary cache memory if both said first state bit and said second state bit are set or said modify bit in said primary cache memory is set.

11. The data processing system having a cache coherency mechanism for supporting a non-inclusive cache memory hierarchy according to claim 8, wherein said data processing system further includes a means for purging a cache line in said secondary cache memory without sending information stored in said cache line to said main memory during a line replacement for said secondary cache memory if a modify bit in said secondary cache memory is not set.

12. The data processing system having a cache coherency mechanism for supporting a non-inclusive cache memory hierarchy according to claim 11, wherein said data processing system further includes a means for sending a cache line in said secondary cache memory to said main memory during said line replacement for said secondary cache memory if said modify bit in said secondary cache memory is set.

13. The data processing system having a cache coherency mechanism for supporting a non-inclusive cache memory hierarchy according to claim 8, wherein said data processing system further includes a means for setting a modify bit in said secondary cache memory while writing a cache line to said secondary cache memory during a cast-out for said primary cache memory if said modify bit in said primary cache memory is set.

14. The data processing system having a cache coherency mechanism for supporting a non-inclusive cache memory hierarchy according to claim 13, wherein said data processing system further includes a means for resetting said modify bit in said secondary cache memory while writing a cache line to said secondary cache memory during said cast-out for said primary cache memory if said modify bit in said primary cache memory is not set.

15. A data processing system having a cache coherency mechanism for supporting a non-inclusive cache memory hierarchy, said data processing system comprising:

a main memory;

a primary cache memory that stores a modify bit, a first state bit, and a second state bit in association with each cache line within said primary cache;

a secondary cache memory, wherein said secondary cache memory and said primary cache memory are non-inclusive;

means for writing data to only said primary cache memory and said main memory, in a store operation when said primary cache memory is in a write-through mode; and means for writing data to only said primary cache memory during a store operation when said primary cache memory is in a write-back mode.

16. The data processing system having a cache coherency mechanism for supporting a non-inclusive cache memory hierarchy according to claim 15, wherein said means for writing data to said primary cache memory in a write-through mode further includes a means for setting said first state bit.

17. The data processing system having a cache coherency mechanism for supporting a non-inclusive cache memory hierarchy according to claim 15, wherein said means for writing data to said primary cache memory in a write-back mode further includes a means for setting said modify bit.

18. The data processing system having a cache coherency mechanism for supporting a non-inclusive cache memory hierarchy according to claim 15, wherein said data processing system further includes a means for setting said second state bit when a cache line exists in both of said primary cache and said secondary cache.

* * * * *